(12) United States Patent
Ong

(10) Patent No.: US 9,774,502 B2
(45) Date of Patent: Sep. 26, 2017

(54) SYSTEMS AND METHODS FOR COMBINED SOFTWARE DEFINED NETWORKING AND DISTRIBUTED NETWORK CONTROL

(71) Applicant: Lyndon Yee Ling Ong, Sunnyvale, CA (US)

(72) Inventor: Lyndon Yee Ling Ong, Sunnyvale, CA (US)

(73) Assignee: Ciena Corporation, Hanover, MD (US)

(*) Notice: Subject to any disclaimer, the term of this patent is extended or adjusted under 35 U.S.C. 154(b) by 344 days.

(21) Appl. No.: 14/314,369

(22) Filed: Jun. 25, 2014

(65) Prior Publication Data

US 2015/0381428 A1 Dec. 31, 2015

(51) Int. Cl.
*H04L 12/24* (2006.01)
*H04L 12/721* (2013.01)
*H04L 12/717* (2013.01)
*H04L 29/08* (2006.01)
*H04L 12/937* (2013.01)

(52) U.S. Cl.
CPC ........... *H04L 41/12* (2013.01); *H04L 41/08* (2013.01); *H04L 45/38* (2013.01); *H04L 45/42* (2013.01); *H04L 45/44* (2013.01); *H04L 49/254* (2013.01); *H04L 67/10* (2013.01)

(58) Field of Classification Search
CPC ......... H04L 41/08; H04L 41/12; H04L 45/38; H04L 45/42; H04L 45/44; H04L 49/254; H04L 67/10
See application file for complete search history.

(56) References Cited

U.S. PATENT DOCUMENTS

| | | | |
|---|---|---|---|
| 6,724,756 B2 * | 4/2004 | Fourie | H04Q 11/0478 370/216 |
| 7,164,679 B2 | 1/2007 | Kotha et al. | |
| 8,009,681 B2 | 8/2011 | Ong et al. | |
| 8,045,481 B2 | 10/2011 | Ong et al. | |
| 8,112,545 B1 | 2/2012 | Ong | |
| 8,433,192 B2 | 4/2013 | Frankel et al. | |
| 8,531,969 B2 | 9/2013 | Ong | |

(Continued)

FOREIGN PATENT DOCUMENTS

FR  WO 2011101575 A1 *  8/2011  ......... H04L 12/4641

OTHER PUBLICATIONS

Ashwood-Smith et al., "SDN State Reduction; draft-ashwood-sdnrg-state-reduction-O0.txt", Internet Research Task Force, Jul. 3, 2013, pp. 1-46.

(Continued)

*Primary Examiner* — Uzma Alam
(74) *Attorney, Agent, or Firm* — Clements Bernard Walker PLLC; Christopher L. Bernard; Lawrence A. Baratta, Jr.

(57) ABSTRACT

A hybrid control method for a network includes operating edge switches under software defined networking control, wherein each of the edge switches is communicatively coupled to a controller for the software defined networking control; operating non-adjacent switches communicatively coupling the edge switches together under distributed control, wherein the non-adjacent switches are not coupled to the controller; and utilizing the controller to route traffic between the edge switches through the non-adjacent switches in a hybrid control scheme including both the software defined networking control and the distributed control.

20 Claims, 11 Drawing Sheets

(56) References Cited

U.S. PATENT DOCUMENTS

| | | | |
|---|---|---|---|
| 8,606,105 B2 | 12/2013 | Ong | |
| 8,724,505 B2 | 5/2014 | Ong | |
| 9,319,336 B2* | 4/2016 | Thakkar | H04L 47/50 |
| 9,369,408 B1* | 6/2016 | Raghavan | H04L 49/557 |
| 2007/0201383 A1 | 8/2007 | Ong et al. | |
| 2008/0175154 A1 | 7/2008 | Ong et al. | |
| 2011/0238816 A1* | 9/2011 | Vohra | H04L 41/0806 |
| | | | 709/224 |
| 2012/0099591 A1* | 4/2012 | Kotha | H04L 45/54 |
| | | | 370/392 |
| 2013/0028091 A1* | 1/2013 | Sun | G06F 9/5083 |
| | | | 370/236 |
| 2013/0060929 A1* | 3/2013 | Koponen | H04L 12/4633 |
| | | | 709/224 |
| 2013/0103817 A1* | 4/2013 | Koponen | G06F 9/45558 |
| | | | 709/223 |
| 2013/0128746 A1* | 5/2013 | Yedavalli | H04L 45/38 |
| | | | 370/238 |
| 2013/0223440 A1* | 8/2013 | DeCusatis | H04L 67/1097 |
| | | | 370/388 |
| 2013/0279371 A1* | 10/2013 | Takashima | H04L 45/38 |
| | | | 370/254 |
| 2013/0329734 A1 | 12/2013 | Chesla et al. | |
| 2014/0098710 A1 | 4/2014 | Ong | |
| 2014/0112190 A1 | 4/2014 | Chou et al. | |
| 2014/0146664 A1* | 5/2014 | Amante | H04L 45/50 |
| | | | 370/228 |
| 2014/0169158 A1* | 6/2014 | Mishra | H04L 69/04 |
| | | | 370/228 |
| 2014/0192646 A1* | 7/2014 | Mir | H04L 43/0829 |
| | | | 370/235 |
| 2014/0241353 A1* | 8/2014 | Zhang | H04L 45/74 |
| | | | 370/390 |
| 2014/0365622 A1* | 12/2014 | Iyengar | H04L 67/1097 |
| | | | 709/220 |
| 2015/0055452 A1* | 2/2015 | Lee | H04L 49/351 |
| | | | 370/218 |
| 2015/0200803 A1* | 7/2015 | Kashyap | H04L 41/12 |
| | | | 370/217 |
| 2015/0334001 A1* | 11/2015 | Sato | H04L 12/6418 |
| | | | 370/392 |
| 2015/0365537 A1* | 12/2015 | Kahn | H04M 15/58 |
| | | | 455/408 |
| 2016/0050104 A1* | 2/2016 | Wackerly | H04L 41/12 |
| | | | 370/220 |

OTHER PUBLICATIONS

Filsfils, et al., "Segment Routing Centralized Egress Peer Engineering draft-filsfils-spring-segment-routing-central-epe-08", Network Working Group, May 26, 2014, pp. 1-38.

Lu et al., "HybNET: Network Manager for a Hybrid Network Infrastructure," Dec. 9, 2013, pp. 1-6.

Oct. 28, 2015 European Search Report issued in European Patent Application No. EP 15173439.

Ong, Lyndon, "ONF Optical Transport Activities," Optical Internetworking Forum, Mar. 12, 2014, slides 1-10.

Ong, Lyndon, "Transport SDN Directions," Optical Internetworking Forum, Mar. 20, 2013, slides 1-17.

Das, Saurav et al., "Packet and Circuit Network Convergence with OpenFlow," pp. 1-3.

"OpenFlow Switch Specification," Open Networking Foundation, Version 1.3.4 (Protocol version 0x04), Mar. 27, 2014 pp. 1-171.

Pan, Ping et al., "Open Transport Switch: Supporting SDN in Transport Networks," Oct. 2012, slides 1-16.

\* cited by examiner

SYSTEMS AND METHODS FOR COMBINED SOFTWARE DEFINED NETWORKING AND DISTRIBUTED NETWORK CONTROL

FIELD OF THE DISCLOSURE

The present disclosure relates generally to networking systems and methods. More particularly, the present disclosure relates to systems and methods for combined Software Defined Networking (SDN) and distributed network control.

BACKGROUND OF THE DISCLOSURE

SDN is an emerging framework which includes a centralized control plane decoupled from the data plane. Conventionally, SDN works with a central controller knowing a full network topology through configuration or through use of a controller-based discovery process. The controller differs from a management system in that it controls the forwarding behavior of the switch only, and performs control in real time or near real time, reacting to changes in services requested, network traffic analysis and network changes such as failure and degradation. Also, the controller provides a standard northbound interface to allow applications to access network resource information and policy-limited control over network behavior or treatment of application traffic. The controller sends commands to each network switch to control matching of data flows received and actions to be taken, including any manipulation of packet contents and forwarding to specified egress ports. Egress ports on each network switch are assumed to be fixed to connect directly with a remote switch. The controller may use commands to change characteristics of the egress port, but cannot change the remote endpoint that the port connects to. Connections are made by having the controller issue commands to a series of network switches, configuring their flow tables to forward data from the ingress port on the source switch to the desired destination switch and egress port. Examples of this type of software defined network control include OpenFlow (www.opennetworking.org/sdn-resources/onf-specifications/openflow/), General Switch Management Protocol (GSMP) defined in RFC 3294 (June 2002), and Forwarding and Control Element Separation (ForCES) defined in RFC 5810 (March 2010), the contents of all are incorporated by reference herein.

There are various shortcomings of these conventional SDN approaches. First, there is limited control and flexibility—once the controller has been informed of the topology, either by configuration or by controller-based discovery, this topology does not change even if traffic patterns change. The controller is only able to redirect data flows within the fixed topology. Second, there is a heavy process load on the controller. Specifically, the controller is responsible for contacting each switch in the network in order to set up flows and to discover the overall network topology. The system cannot take advantage of any local intelligence on the switch in order to offload processing from the controller. Third, there is the involvement of the controller in any recovery actions—in order to recover from a failure, the controller must be involved in the rerouting of all connections that have been affected by the failure, causing an instantaneous spike in load on the controller when a failure occurs. Failure of the controller must be avoided by high availability design of the controller and high redundancy and performance of the control network to support messaging between each switch and the controller. Finally, there is a requirement to convert every network node over to a centralized control scheme—in order for the system to work, every node in the network must be converted over to software defined control from the controller, regardless of any pre-existing control mechanism.

BRIEF SUMMARY OF THE DISCLOSURE

In an exemplary embodiment, a hybrid control method for a network includes operating edge switches under software defined networking control, wherein each of the edge switches is communicatively coupled to a controller for the software defined networking control; operating non-adjacent switches communicatively coupling the edge switches together under distributed control, wherein the non-adjacent switches are not coupled to the controller; and utilizing the controller to route traffic between the edge switches through the non-adjacent switches in a hybrid control scheme including both the software defined networking control and the distributed control. The hybrid control method can further include providing the controller a topology by the edge switches. The hybrid control method can further include providing the controller an identity and remote endpoint for each physical port, and a set of logical ports associated with the physical port for each of the physical ports. The edge switches can include logical ports and physical ports, wherein the physical ports are connected to the non-adjacent switches in a fixed manner, but wherein the logical ports are connected through the non-adjacent switches to remote edge switches and this connectivity can be managed by the software defined networking control.

The hybrid control method can further include causing the non-adjacent switches by the controller to form connections between the edge switches, wherein the non-adjacent switches utilize a control plane to establish the connections. The connections can include any of virtual local area networks, subnetwork connections, label switched paths, and link aggregation groups, and wherein the connections are established without software defined networking control. The connections can be initiated by the controller via one of an explicit route object or a designated transit list. The hybrid control method can further include creating match/action rules for forwarding tables at the edge switches to switch packet flows across the connections. The connections can be initiated by the controller with metadata included in signaling. The software defined networking control is implemented only at the edge switches which are communicatively coupled to client devices.

In another exemplary embodiment, a network includes a plurality of edge switches under software defined networking control; a controller, wherein each of the plurality of edge switches is communicatively coupled to the controller for the software defined networking control; a plurality of non-adjacent switches communicatively coupling the edge switches together, wherein the non-adjacent switches are not coupled to the controller, and wherein the non-adjacent switches are under distributed control; and wherein the controller configures forwarding of traffic between the edge switches through the non-adjacent switches in a hybrid control scheme including both the software defined networking control and the distributed control. The plurality of edge switches can be configured to provide a topology to the controller including an identity and remote endpoint for each physical port and a set of logical ports associated with the physical port for each of the physical ports. The plurality of edge switches can include logical ports and physical ports, wherein the physical ports are connected to the non-adjacent switches in a fixed manner, and wherein the logical ports are connected through the non-adjacent switches to remote edge switches and this connectivity can be managed by the software defined networking control.

The controller can be configured to cause the non-adjacent switches by the controller to form connections between the edge switches, wherein the non-adjacent switches utilize a control plane to establish the connections. The connections can include any of virtual local area networks, subnetwork connections, label switched paths, and link aggregation groups, and wherein the connections are established without software defined networking control. The connections can be initiated by the controller via one of an explicit route object or a designated transit list. The controller can be configured to create match/action rules for forwarding tables at the plurality of edge switches to switch connections across the connections. The connections can be initiated by the controller with metadata included in signaling. The software defined networking control can be implemented only at the plurality of edge switches which are communicatively coupled to client devices.

In yet another exemplary embodiment, a controller includes a network interface communicatively coupled to a plurality of edge switches; a processor; and memory storing instructions that, when executed, cause the processor to: receive topology of the plurality of edge switches; cause connections to be created via distributed control between non-adjacent switches connected to the plurality of edge switches; and program forwarding tables at the plurality of edge switches through the connections; wherein the non-adjacent switches are not under software defined control associated with the controller.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, systems and methods for combined SDN and distributed network control are described. Specifically, the systems and methods described a hybrid control scheme where edge switches (also can be referred to as service switches, etc.) are under control of an SDN controller while core switches are under distributed control such as through a control plane. The systems and methods provide an integrated solution coordinating both centralized SDN interfaces and distributed control with an ability for the controller to determine network topology without having to interact with every network switch. Advantageously, the systems and method allow an ability to add software defined network control without having to convert every network switch to support the software defined control interface, an ability to offload the controller from having to interact with every network switch, an ability to specify explicit routes for traffic engineering from the centralized interface without the controller interacting with every switch in the path, and an ability to specify special treatment at the terminating switch by matching on metadata contained in a setup message. That is, the systems and methods leverage the existing distributed control schemes while providing the advantages of the SDN control interface at the edges.

Exemplary SDN and Distributed Control Network

Figure 1:
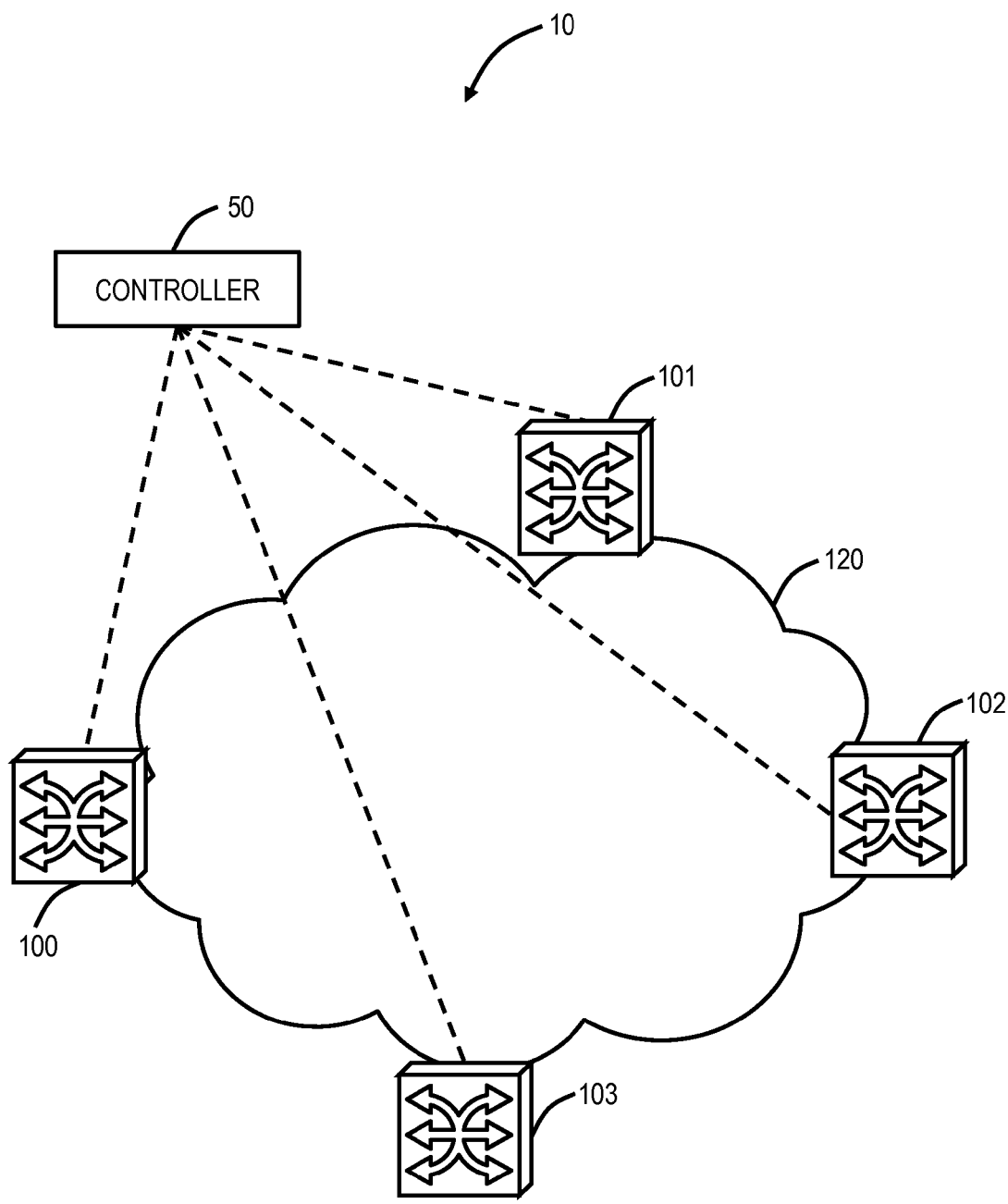
FIG. 1 is a network diagram of a network with a controller communicatively coupled to switches.

Referring to FIG. 1, in an exemplary embodiment, a network diagram illustrates a network 10 with a controller 50 communicatively coupled to switches 100, 101, 102, 103. The switches 100, 101, 102, 103 are communicatively coupled to one another via a core network 120. In various exemplary embodiments, the switches 100, 101, 102, 103 and the core network 120 can utilize packet and/or time-division multiplexing (TDM). The controller 50 is an SDN controller and is communicatively coupled to the switches 100, 101, 102, 103 which are edge switches. There are a plurality of switches in the core network 120 which are omitted for illustration purposes. Of note, the controller 50 does not directly connect to or control the plurality of switches in the core network 120. Instead, the plurality of switches in the core network 120 can utilize distributed control such as through a control plane. Control planes provide automatic allocation of network resources in an end-to-end manner.

Exemplary control planes may include Automatically Switched Optical Network (ASON) as defined in G.8080/Y.1304, Architecture for the automatically switched optical network (ASON), the contents of which are herein incorporated by reference; Generalized Multi-Protocol Label Switching (GMPLS) Architecture as defined in Request for Comments (RFC): 3945 and the like, the contents of which are herein incorporated by reference; Optical Signaling and Routing Protocol (OSRP); or any other type control plane for controlling network elements at one or more layers, and establishing connections there between. As described herein, these control planes deal with routing signals at Layers 0, 1, and 2, i.e., photonic signals, time division multiplexing (TDM) signals such as, for example, Synchronous Optical Network (SONET), Synchronous Digital Hierarchy (SDH), Optical Transport Network (OTN), Ethernet, MPLS, and the like. Control planes are configured to establish end-to-end signaled connections such as subnetwork connections (SNCs) in ASON or OSRP and label switched paths (LSPs) in GMPLS and MPLS. Control planes use the available paths to route the services and program the underlying hardware accordingly. This can be referred to as distributed control since the control plane operates across the plurality of switches in the core network 120. The SDN controller 50 can be referred to as centralized control as it directly controls the switches 100, 101, 102, 103 in a centralized manner.

SDN/OpenFlow Switch Model

Figure 2:
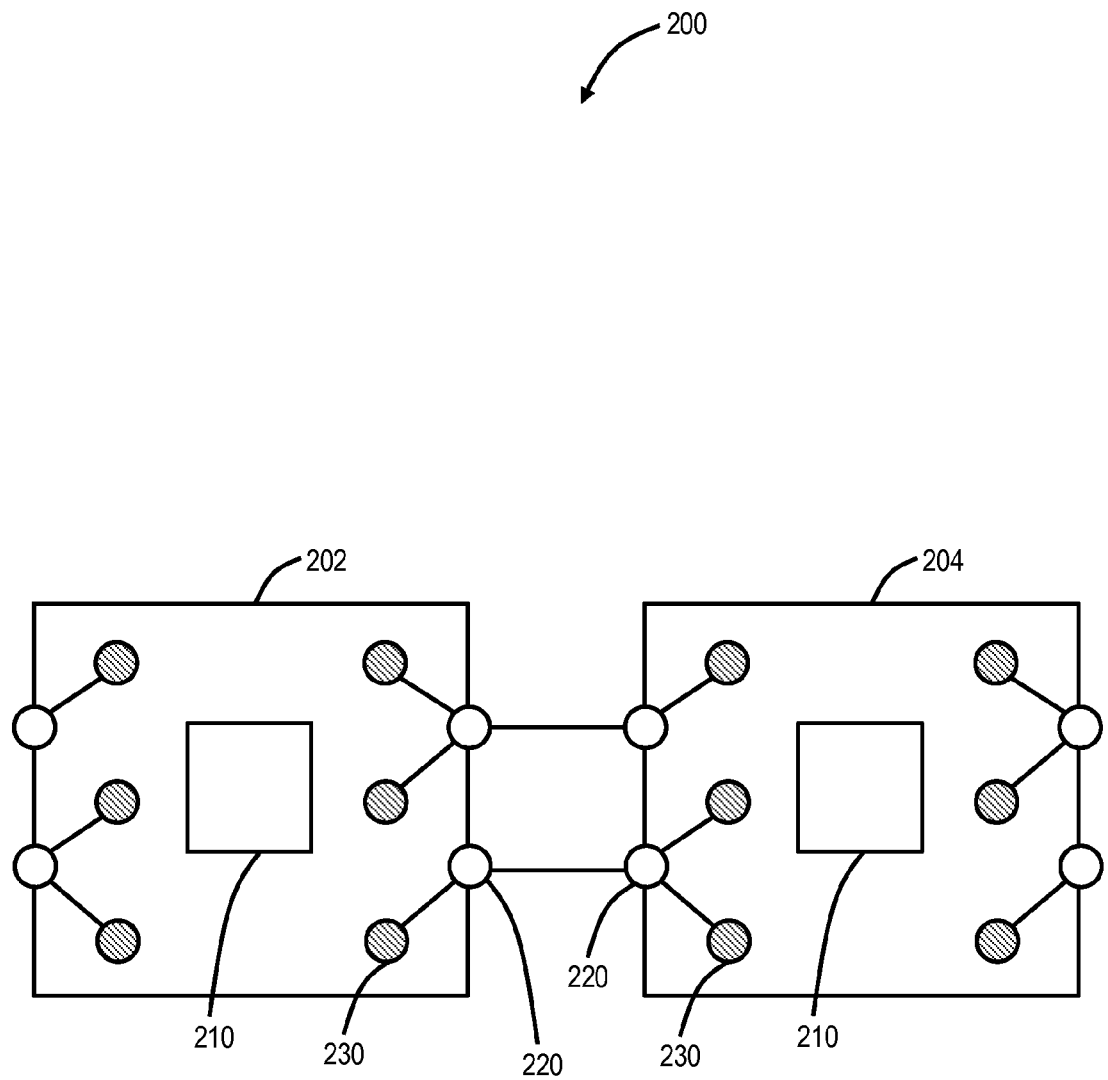
FIG. 2 is a block diagram of an SDN/OpenFlow switch model.

Referring to FIG. 2, in an exemplary embodiment, a block diagram illustrates an SDN/OpenFlow switch model 200. The SDN/OpenFlow switch model 200 describes how the switches 100, 101, 102, 103 are model in SDN, such as in OpenFlow. The switch model 200 includes two switches 202, 204. Each of the switches 202, 204 include forwarding tables 210, physical ports 220, and logical ports 230. The physical ports 220 are switch defined ports that correspond to a hardware interface of the switches 202, 204. For example, on an Ethernet switch, physical ports map one-to-one to the Ethernet interfaces, on an OTN switch, physical ports map one-to-one to OTU interfaces. In some deployments, the OpenFlow switch may be virtualized over the switch hardware. In those cases, an OpenFlow physical port may represent a virtual slice of the corresponding hardware interface of the switch.

The logical ports 230 are switch defined ports that do not correspond directly to a hardware interface of the switches 202, 204. Logical ports are higher level abstractions that may be defined in the switch using non-OpenFlow methods (e.g. OTN ODU connections, link aggregation groups, tunnels, loopback interfaces, etc.). The logical ports 230 may include packet encapsulation and may map to various physical ports 220. The processing done by the logical port 230 is implementation dependent and must be transparent to OpenFlow processing, and those ports must interact with OpenFlow processing like OpenFlow physical ports. The only differences between the physical ports 220 and the logical ports 230 is that a packet associated with a logical port may have an extra pipeline field called Tunnel-ID associated with it and when a packet received on a logical port is sent to the controller 50, both its logical port and its underlying physical port are reported to the controller 50.

Note, the physical ports 220 are directly coupled physically whereas the logical ports are connected by SDN, the control plane, etc. An example is a switch with the physical port being an optical fiber termination that is connected to another switch at the other end of the fiber —the physical port cannot be reconnected to another switch unless you physically manipulate the fiber. On the other hand, an OTN ODU connection over the fiber can be viewed as a logical port that is associated with the physical port, but the endpoint of the ODU connection (i.e., the remote end of that logical port) can be reconfigured using the distributed control plane so that the connection terminates on some remote switch.

The forwarding tables 210 allow switching between the physical ports 220 and the logical ports 230. OpenFlow allows remote administration of a switch's packet forwarding tables, by adding, modifying and removing packet matching rules and actions. This way, routing decisions can be made periodically or ad hoc by the controller 50 and translated into rules and actions with a configurable lifespan, which are then deployed to forwarding tables 210, leaving the actual forwarding of matched packets to the switch 202, 204 at wire speed for the duration of those rules. Packets which are unmatched by the switch 202, 204 can be forwarded to the controller 50. The controller 50 can then decide to modify existing forwarding table 210 rules on one or more switches or to deploy new rules, to prevent a structural flow of traffic between switch 202, 204 and the controller 50. It could even decide to forward the traffic itself, provided that it has told the switch 202, 204 to forward entire packets instead of just their header.

Topology Discovery

Figure 3:
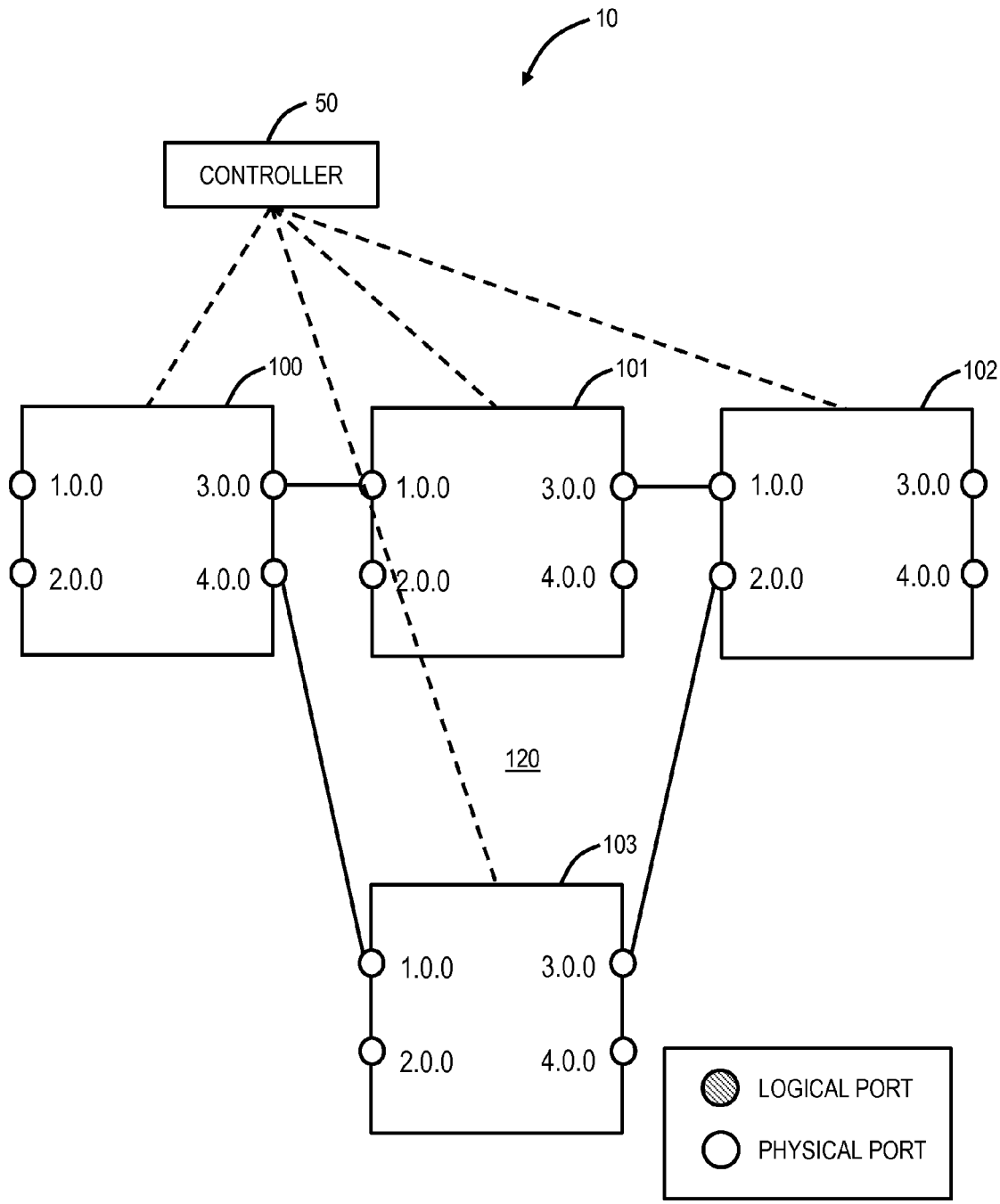
FIG. 3 is a network diagram of the network of FIG. 1 illustrating the switches and physical port connectivity therebetween.

Referring to FIG. 3, in an exemplary embodiment, a network diagram illustrates the network 10 with the switches 100, 101, 102, 103 illustrating physical port 220 connectivity therebetween. The physical ports 220 can be connected through the core network 120. Each of the switches 100, 101, 102, 103 are communicatively coupled to the controller 50. The physical ports (Pport) 220 can be addressed as X.0.0 where X is the physical port 220 on the switch 100, 101, 102, 103. The switches 100, 101, 102, 103 can communicate the following topology to the controller 50:

| Switch 100 to Controller 50: | Pport 3.0.0: remote end = 101:1.0.0 |
| | Pport 4.0.0: remote end = 103:1.0.0 |
| Switch 101 to Controller 50: | Pport 1.0.0: remote end = 100:3.0.0 |
| | Pport 3.0.0: remote end = 102:1.0.0 |
| Switch 102 to Controller 50: | Pport 1.0.0: remote end = 102:3.0.0 |
| | Pport 2.0.0: remote end = 103:3.0.0 |
| Switch 103 to Controller 50: | Pport 1.0.0: remote end = 100:4.0.0 |
| | Pport 3.0.0: remote end = 102:2.0.0 |

Hybrid Control Scheme

Figure 4:
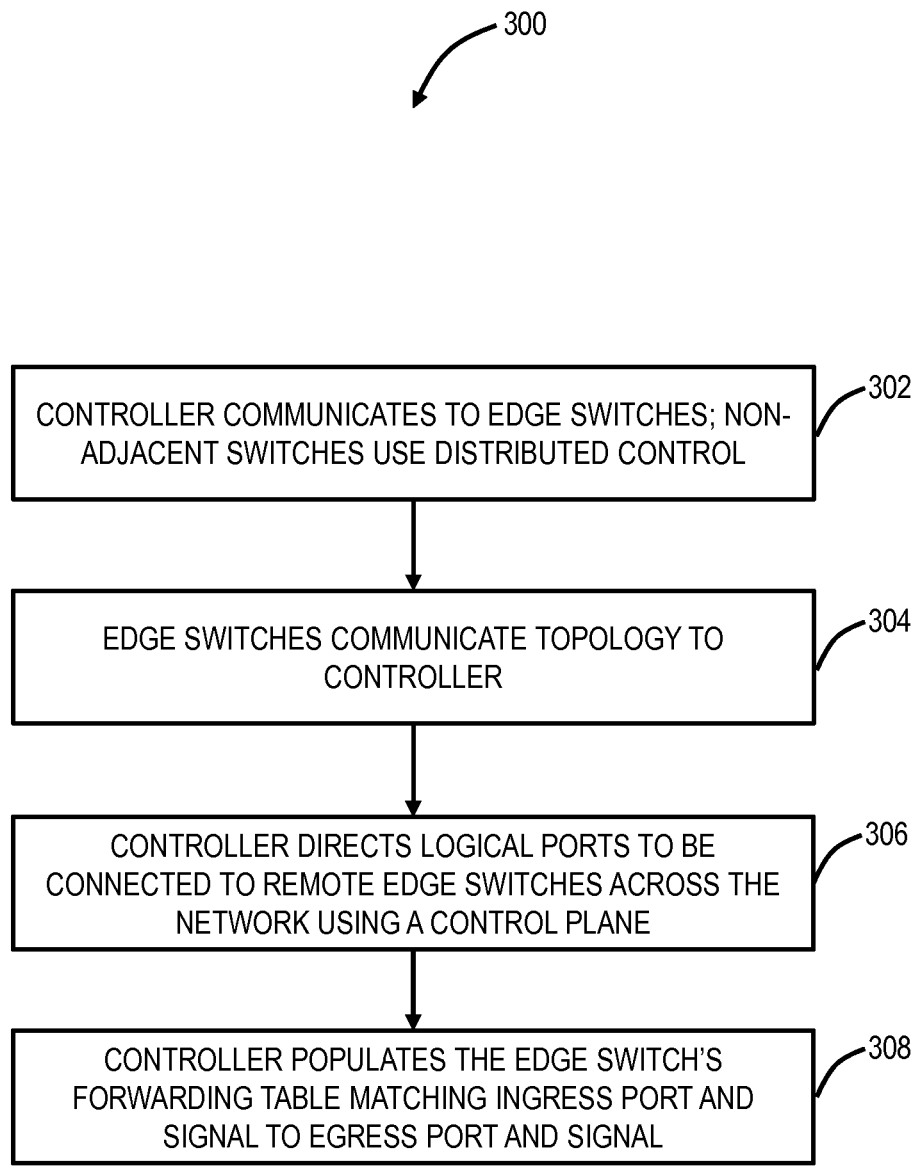
FIG. 4 is a flowchart of a hybrid control method.

Referring to FIG. 4, in an exemplary embodiment, a flowchart illustrates a hybrid control method 300. In various exemplary embodiments, the systems and methods use a combination of the physical ports 220 and the logical ports 230 in the network 10 with the controller 40 to discover virtual topology and provision large bandwidth end-to-end connections across the network using distributed signaling between switches, using these as virtual links for packet or lower rate circuit services. The hybrid control method 300 enables the controller 50 to use SDN, centralized control of the switches 100, 101, 102, 103 and control plane, distributed control of the non-adjacent switches in the core network 120. As described herein, non-adjacent switches are switches not connected to the controller 50 and not under its control. The non-adjacent switches can utilize distributed control.

The hybrid control method 300 includes the controller 50 communicates to the edge switches 100, 101, 102, 103 and the non-adjacent switches utilize distributed control (step 302). That is, the controller 50 talks to the edge switches 100, 101, 102, 103, but does not communicate to the non-adjacent switches. The edge switches 100, 101, 102, 103 communicate topology to the controller 50 (step 304). The edge switch 100, 101, 102, 103 first informs the controller 50 of the identity and remote endpoint for each physical port 220, and a set of logical ports 230 associated with the physical port 220. The controller 50 may or may not know full topology of how edge switches 100, 101, 102, 103 are connected.

At first, the remote endpoints for the logical ports 230 may be undefined, unless some have been preconfigured to attach to a remote edge switch 100, 101, 102, 103. After this, the controller 50 is able to modify the remote endpoints of each logical port 230 to connect to a particular remote edge switch 100, 101, 102, 103 and may optionally assign an explicit path across the network to that logical port, thus controlling end-to-end connections across the network 10.

The controller 50 can direct logical ports 230 to be connected to non-adjacent switch across the network 10 using a control plane (step 306). Distributed control is then triggered by the port modification instruction from the controller 50 in order to provision the tunnel across the network 10. Intermediate nodes do not need to have direct control input from the controller 50 and switch the lower layer connection using cheaper lower layer switching fabrics. The controller 50 only needs to interact with the edge switch 100, 101, 102, 103 to specify the endpoint and optionally the path of the tunnel associated with a logical port 230, and then any associated matches that direct client packets into the logical port 230.

The controller 50 populates the switch's forwarding table matching ingress port and signal to egress port and signal (step 308). The controller 50 then configures a flow table in the edge switch 100, 101, 102, 103 to match input packets based on packet characteristics such as header values, and then instantiate forwarding of matching packets to an egress logical port 230 connecting at a lower layer to a destination edge switch 100, 101, 102, 103.

Integration of the software defined control interface with corresponding distributed control actions through physical and logical port remote endpoints reduces the overhead associated with the controller 50 and avoids having to have intermediate nodes support the software defined interface, however it still allows the controller 50 and core network 120 to act in coordination. The modifications required to the software defined interface are minor, but involve:

- association of a destination endpoint with a physical or logical port 220, 230;
- ability of the controller 50 to modify the destination endpoint of the logical port;
- ability of the controller 50 to optionally specify an explicit path associated with a logical port;
- ability of the controller 50 to cause metadata to be incorporated into the distributed signaling protocol messages, in order to coordinate actions at the originating and terminating nodes of the tunnel; and
- ability for the terminating node to pass metadata received in a signaling message back up to the controller 50 to indicate timing of connection completion and/or allow for further instruction from the controller for 50 terminating treatment of a particular connection.

Hybrid Virtual Topology

Figure 5:
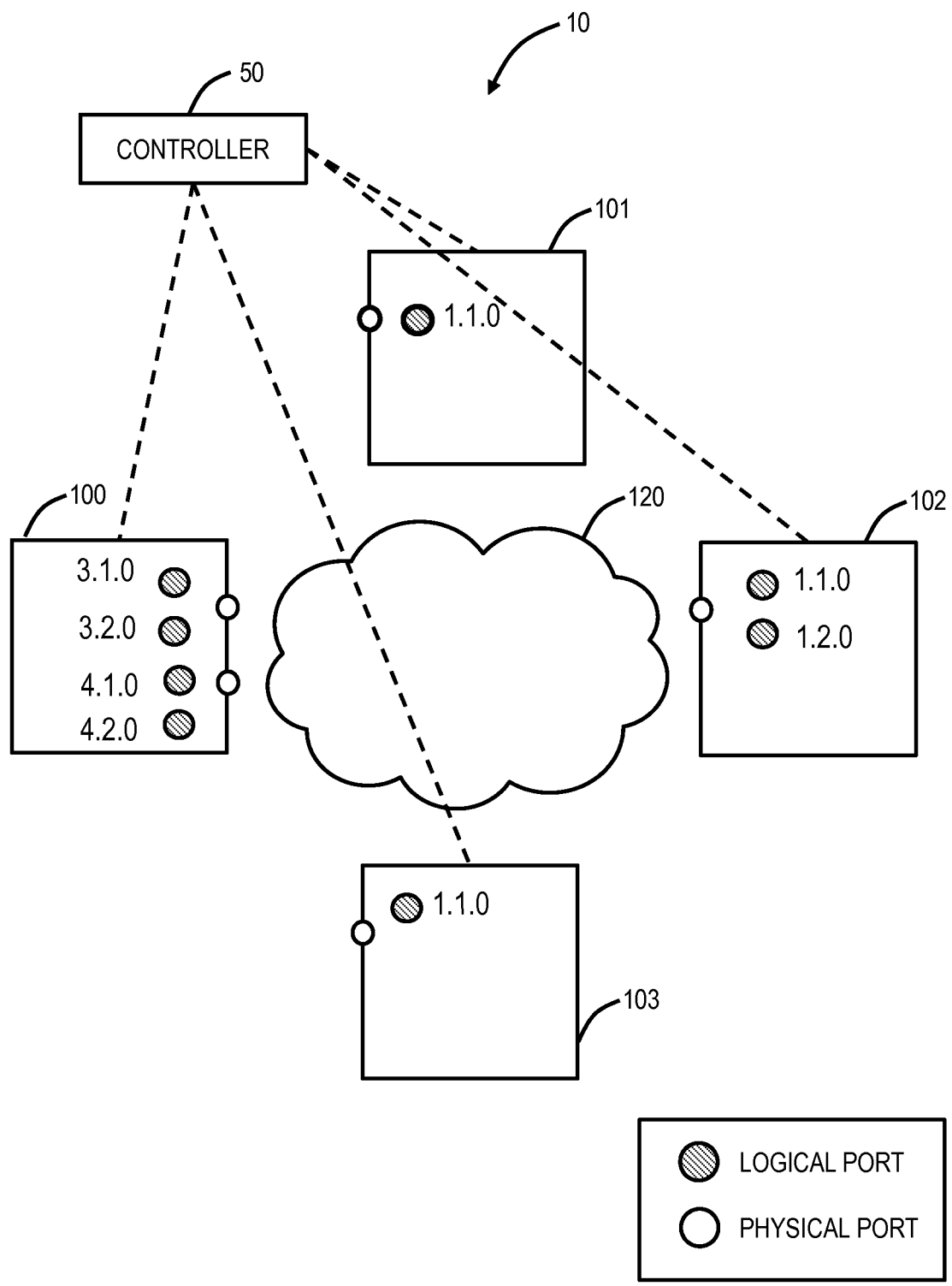
FIG. 5 is a network diagram of the network of FIG. 1 with the switches illustrating physical port and associated logical ports.

Referring to FIG. 5, in an exemplary embodiment, a network diagram illustrates the network 10 with the switches 100, 101, 102, 103 illustrating physical port 220 and associated logical ports 230. Again, the physical ports 220 can be connected through the core network 120. Each of the switches 100, 101, 102, 103 are communicatively coupled to the controller 50. The physical ports (Pport) 220 can be addressed as X.0.0 where X is the physical port 220 on the switch 100, 101, 102, 103. The logical ports (Lport) 230 can be addresses as X.Y.0 where Y is the logical port 230 and X is the associated physical port 220 for the logical port 230. The switches 100, 101, 102, 103 can have the following logical ports 230:

| Switch 100 to Controller 50: | Pport 3.0.0: |
| --- | --- |
| | Lport 3.1.0 |
| | Lport 3.2.0 |
| | Pport 4.0.0: |
| | Lport 4.1.0 |
| | Lport 4.2.0 |

| Switch 101 to Controller 50: | Pport 1.0.0: |
| --- | --- |
| | Lport 1.1.0 |
| Switch 102 to Controller 50: | Pport 1.0.0: remote end = 102:3.0.0 |
| | Lport 1.1.0 |
| | Lport 1.2.0 |
| Switch 103 to Controller 50: | Pport 1.0.0: remote end = 100:4.0.0 |
| | Lport 1.1.0 |

Connection or Tunnel Setup

Figure 6:
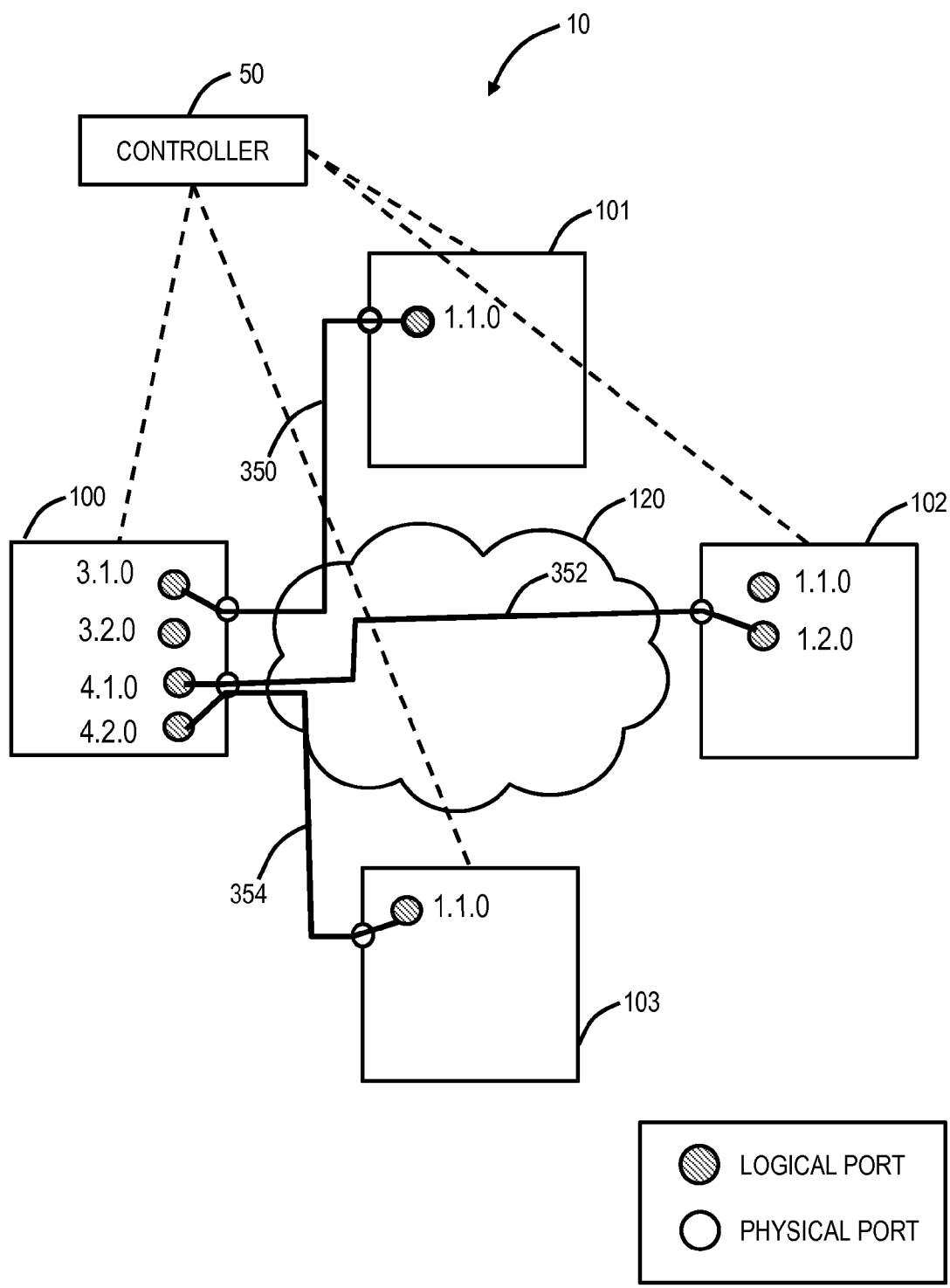
FIG. 6 is a network diagram of the network of FIG. 1 with the switches illustrating connection/tunnel setup via the physical ports and the associated logical ports.

Referring to FIG. 6, in an exemplary embodiment, a network diagram illustrates the network 10 with the switches 100, 101, 102, 103 illustrating connection/tunnel setup via the physical ports 220 and the associated logical ports 230. Specifically, in this example, Pport 3, Lport 1 of the switch 100 is connected to Pport 1, Lport 1 of the switch 101 via a connection 350; Pport 4, Lport 1 of the switch 100 is connected to Pport 1, Lport 2 of the switch 102 via a connection 352; and Pport 4, Lport 2 of the switch 100 is connected to Pport 1, Lport 1 of the switch 103 via a connection 354. Note, the connections 350, 352, 354 connect the physical ports 220 through the core network 120. The setup of the paths for the connections 350, 352, 354 can be done through the non-adjacent switches in the core network 120 such as via a control plane. The connections 350, 352, 354 can be tunnels, label switched paths, link aggregation groups, etc., i.e., any technique outside of the SDN control. For example, the connections 350, 352, 354 can be Virtual Local Area Networks (VLANs). The following addresses are established:

| Controller 50 to Switch 100: | Pport 3.0.0: |
| --- | --- |
| | Lport 3.1.0: dest: 101/1.1.0 |
| | Pport 4.0.0: |
| | Lport 4.1.0: dest: 102/1.2.0 |
| | Lport 4.2.0: dest: 103/1.1.0 |
| Switch 101 to Controller 50: | Pport 1.0.0: |
| | Lport 1.1.0: newdest: 100/3.1.0 |
| Switch 102 to Controller 50: | Pport 1.0.0: |
| | Lport 1.1.0: newdest: 100/3.2.0 |
| | Lport 1.2.0: newdest: 100/4.1.0 |
| Switch 103 to Controller 50: | Pport 1.0.0: |
| | Lport 1.1.0: newdest: 100/4.2.0 |

Tunnel Setup with Explicit Route

Figure 7:
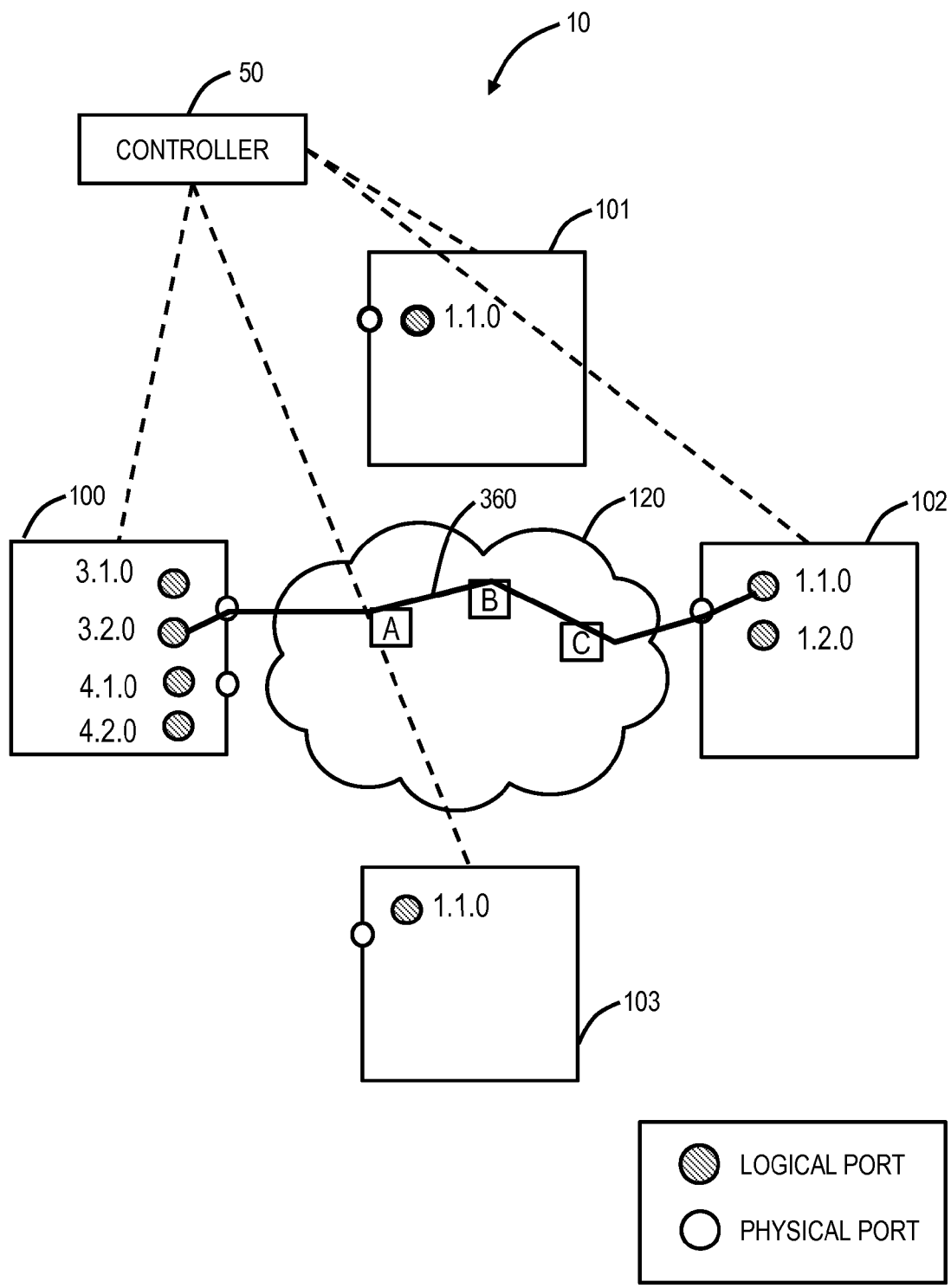
FIG. 7 is a network diagram of the network of FIG. 1 with the switches illustrating a tunnel setup via the physical ports and the associated logical ports with an explicit route designated in the core network.

Referring to FIG. 7, in an exemplary embodiment, a network diagram illustrates the network 10 with the switches 100, 101, 102, 103 illustrating a tunnel setup via the physical ports 220 and the associated logical ports 230 with an explicit route designated in the core network 120. Here, Pport 3, Lport 2 of the switch 100 is connected to Pport 1, Lport 1 of the switch 102 via a connection 360. However, here, the controller 50 can designate an explicit route in the core network 120, e.g. via non-adjacent switches A, B, C. The connection 360 can be any type such as the connections 350, 352, 354. For example, the connection 360 can be a VLAN. This can be done through passing an Explicit Route Object (ERO) or Designated Transit List (DTL) from the controller 50, such as:

| Controller 50 to Switch 100: | Pport 3.0.0: |
| --- | --- |
| | Lport 3.2.0: dest: 102/1.1.0; |
| | ero: {A; B; C} |
| Switch 102 to Controller 50: | Pport 1.0.0: |
| | Lport 1.1.0: newdest: 100/3.2.0 |

Service Setup Over Tunnel/Connection

Figure 8:
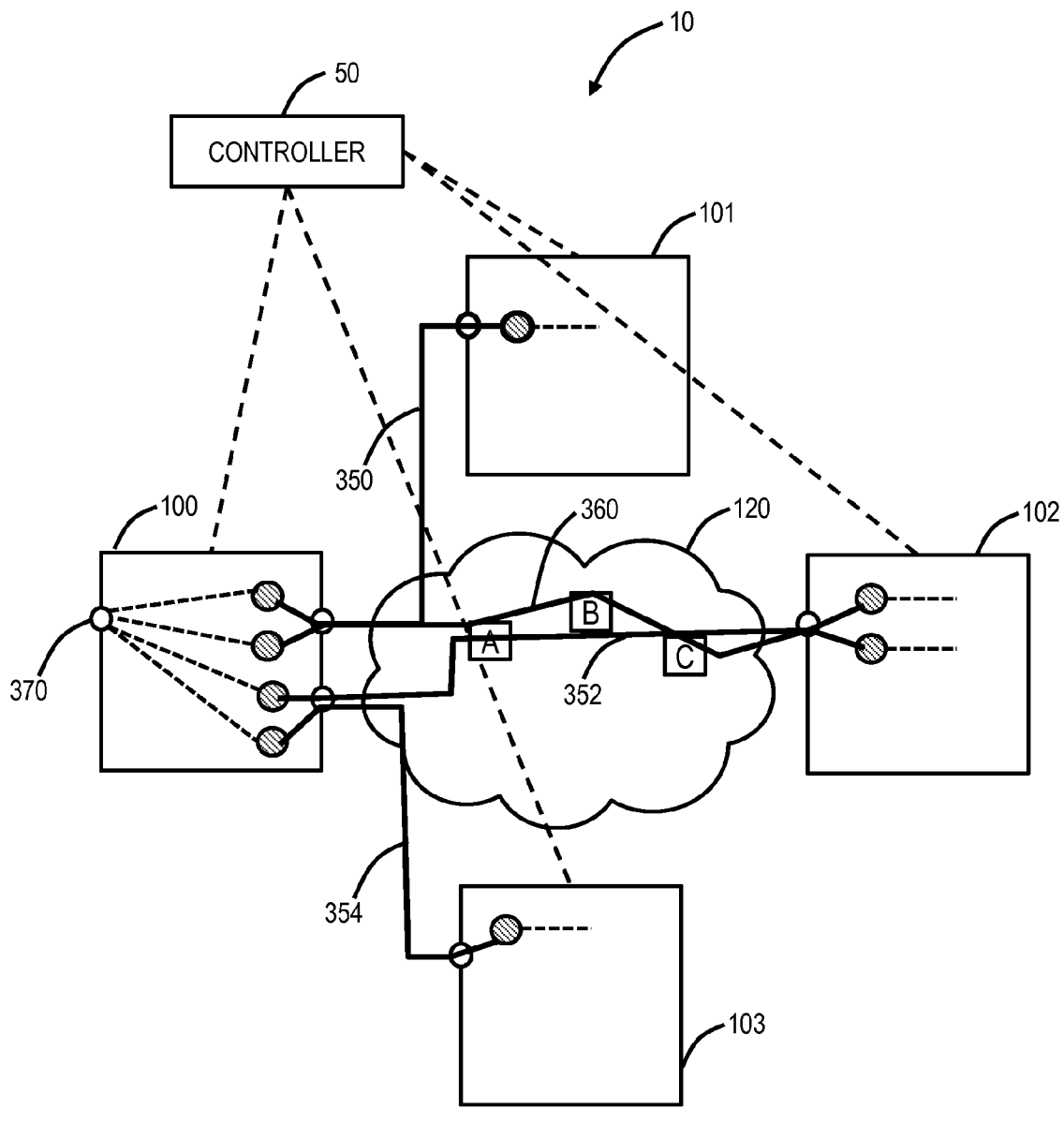
FIG. 8 is a network diagram of the network of FIG. 1 with the switches illustrating service setup over the connections between logical ports.

Referring to FIG. 8, in an exemplary embodiment, a network diagram illustrates the network 10 with the switches 100, 101, 102, 103 illustrating service setup over the connections 350, 352, 354, 360. At this point, the network 10 has the connections 350, 352, 354, 360 established between logical ports 230, and the controller 50 can route traffic via SDN thereon. For example, a physical port 370 on the switch 100 can have the following match/action rules. Here, the VLAN 001 is the connection 350, the VLAN 010 is the connection 360, the VLAN 011 is the connection 352, and the VLAN 100 is the connection 354.

| Controller 50 to Switch 100: | Match: ingress port 1.0; VLAN 001 |
|---|---|
| | Action: egress Lport 3.1.0 |
| | Match: ingress port 1.0; VLAN010 |
| | Action: egress Lport 3.2.0 |
| | Match: ingress port 1.0: VLAN011 |
| | Action: egress Lport 4.1.0 |
| | Match: ingress port 1.0: VLAN100 |
| | Action: egress Lport 4.2.0 |

Tunnel Setup with Metadata

Figure 9:
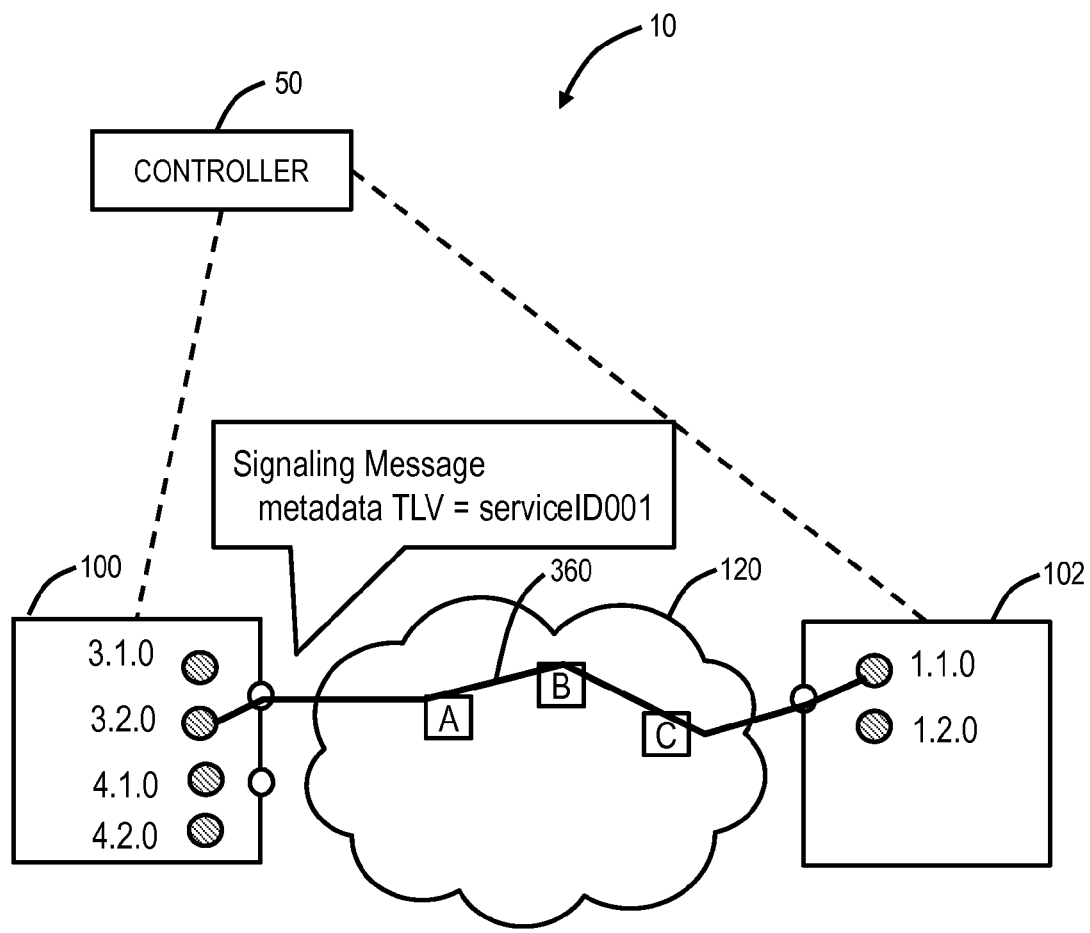
FIG. 9 is a network diagram of the network of FIG. 1 with the switches illustrating a tunnel setup via the physical ports and the associated logical ports with an explicit route designated in the core network and with metadata included in the signaling message.
Figure 9:
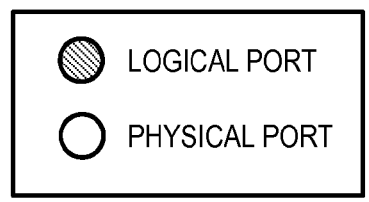

Referring to FIG. 9, in an exemplary embodiment, a network diagram illustrates the network 10 with the switches 100, 101, 102, 103 illustrating a tunnel setup via the physical ports 220 and the associated logical ports 230 with an explicit route designated in the core network 120 and with metadata included in the signaling message. This example is the same as in FIG. 7 for the connection 360. Also, here, the signaling message from the controller 50 includes additional information such as via a Type-Length-Value (TLV) field—e.g. serviceID001:

| Controller 50 to Switch 100: | Pport 3.0.0: |
|---|---|
| | Lport 3.2.0: dest: 102/1.1.0; ero: {A; B; C}; |
| | metadata = serviceID001 |
| Switch 102 to Controller 50: | Switch 102 to Controller: |
| | Pport 1.0.0: |
| | Lport 1.1.0: newdest: 100/3.2.0; |
| | metadata = serviceID001 |
| Controller 50 to Switch 102: | Match: Lport 1.1.0; |
| | Action: egress ClientPort001 |

Exemplary Switch

Figure 10:
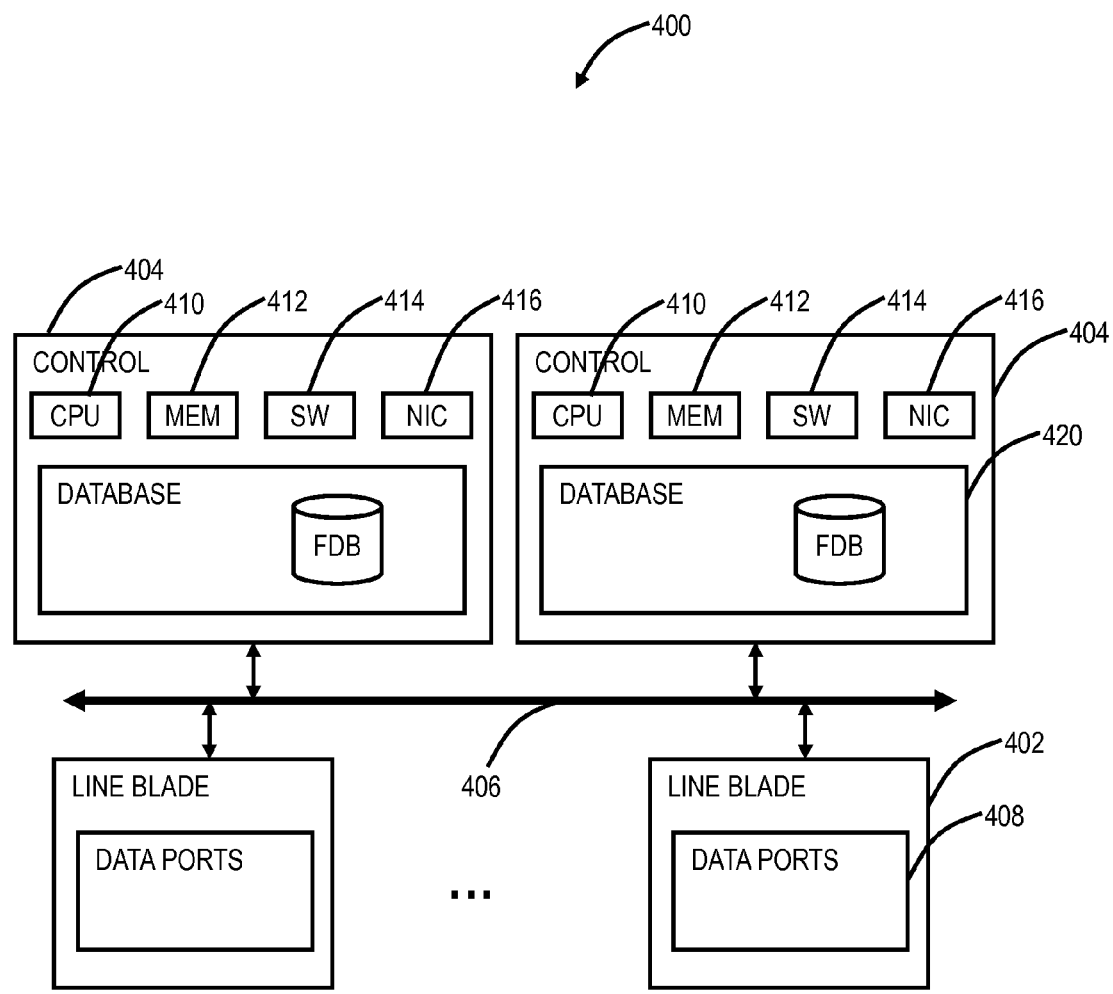
FIG. 10 is a block diagram of an exemplary implementation of a switch.

Referring to FIG. 10, in an exemplary embodiment, a block diagram illustrates an exemplary implementation of a switch 400. In this exemplary embodiment, the switch 400 is an Ethernet network switch, but those of ordinary skill in the art will recognize the systems and methods described herein contemplate other types of network elements and other implementations. In this exemplary embodiment, the switch 400 includes a plurality of blades 402, 404 interconnected via an interface 406. The blades 402, 404 are also known as line cards, line modules, circuit packs, pluggable modules, etc. and refer generally to components mounted within a chassis, shelf, etc. of a data switching device, i.e., the switch 400. Each of the blades 402, 404 can include numerous electronic devices and optical devices mounted on a circuit board along with various interconnects including interfaces to the chassis, shelf, etc.

Two exemplary blades are illustrated with line blades 402 and control blades 404. The line blades 402 generally include data ports 408 such as a plurality of Ethernet ports. For example, the line blade 402 can include a plurality of physical ports disposed on an exterior of the blade 402 for receiving ingress/egress connections. Additionally, the line blades 402 can include switching components to form a switching fabric via the backplane 406 between all of the data ports 408 allowing data traffic to be switched between the data ports 408 on the various line blades 402. The switching fabric is a combination of hardware, software, firmware, etc. that moves data coming into the switch 400 out by the correct port to the next switch 400. "Switching fabric" includes switching units, or individual boxes, in a node; integrated circuits contained in the switching units; and programming that allows switching paths to be controlled. Note, the switching fabric can be distributed on the blades 402, 404, in a separate blade (not shown), or a combination thereof. The line blades 402 can include an Ethernet manager (i.e., a CPU) and a network processor (NP)/application specific integrated circuit (ASIC). As described herein, the line blades 402 can participate in the systems and methods described herein, such as forming the switches 100, 101, 102, 103 and the non-adjacent switches.

The control blades 404 include a microprocessor 410, memory 412, software 414, and a network interface 416. Specifically, the microprocessor 410, the memory 412, and the software 414 can collectively control, configure, provision, monitor, etc. the switch 400. The network interface 416 may be utilized to communicate with an element manager, a network management system, etc. Additionally, the control blades 404 can include a database 420 that tracks and maintains provisioning, configuration, operational data and the like. The database 420 can include a forwarding database (FDB). In this exemplary embodiment, the switch 400 includes two control blades 404 which may operate in a redundant or protected configuration such as 1:1, 1+1, etc. In general, the control blades 404 maintain dynamic system information including Layer two forwarding databases, protocol state machines, and the operational status of the ports within the switch 400.

Exemplary Network Element

Figure 11:
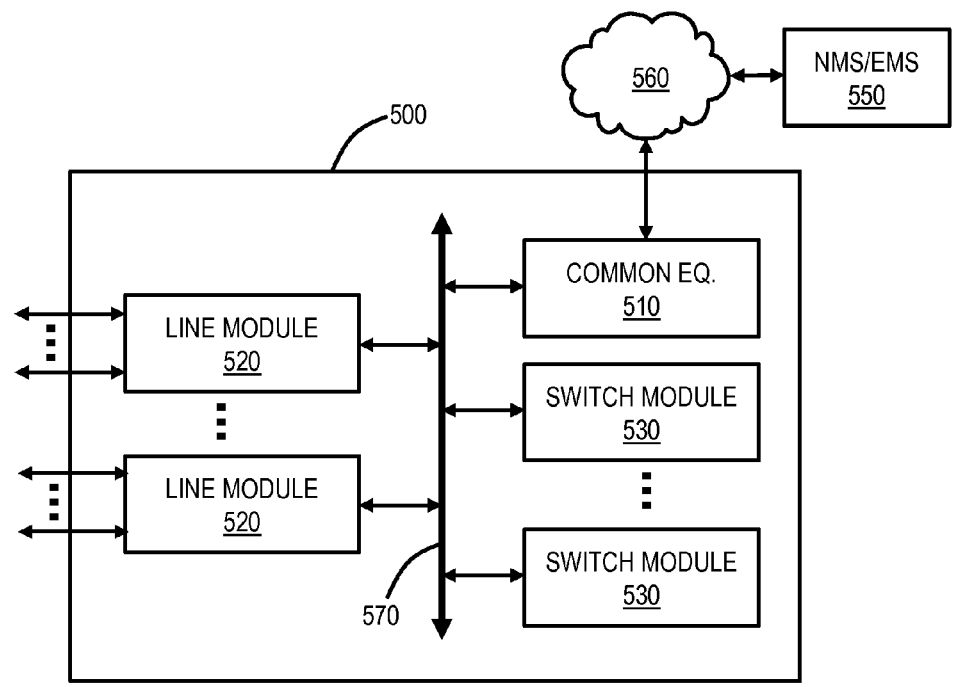
FIG. 11 is a block diagram of an exemplary implementation of a network element.

Referring to FIG. 11, in an exemplary embodiment, a block diagram illustrates an exemplary network element 500 for use with the systems and methods described herein. In an exemplary embodiment, the exemplary network element 500 can be a network element that may consolidate the functionality of a multi-service provisioning platform (MSPP), digital cross connect (DCS), Ethernet and/or Optical Transport Network (OTN) switch, dense wave division multiplexed (DWDM) platform, etc. into a single, high-capacity intelligent switching system providing Layer 0, 1, and/or 2 consolidation. In another exemplary embodiment, the network element 500 can be any of an OTN add/drop multiplexer (ADM), a multi-service provisioning platform (MSPP), a digital cross-connect (DCS), an optical cross-connect, an optical switch, a router, a switch, a wavelength division multiplexing (WDM) terminal, an access/aggregation device, etc. That is, the network element 500 can be any digital system with ingress and egress digital signals and switching of channels, timeslots, tributary units, etc. While the network element 500 is generally shown as an optical network element, the systems and methods contemplated for use with any switching fabric, network element, or network based thereon.

In an exemplary embodiment, the network element 500 includes common equipment 510, one or more line modules 520, and one or more switch modules 530. The common equipment 510 can include power; a control module; operations, administration, maintenance, and provisioning (OAM&P) access; user interface ports; and the like. The common equipment 510 can connect to a management system 550 through a data communication network 560 (as well as a Path Computation Element (PCE), Software Defined Network (SDN) controller, OpenFlow controller, etc.). The management system 550 can include a network management system (NMS), element management system (EMS), or the like. Additionally, the common equipment 510 can include a control plane processor, such as a controller 600 illustrated in FIG. 12, configured to operate the control plane as described herein. The network element 500 can include an interface 570 for communicatively coupling the common equipment 510, the line modules 520, and the switch modules 530 together. For example, the interface 570 can be a backplane, mid-plane, a bus, optical or electrical connectors, or the like. The line modules 520 are configured to provide ingress and egress to the switch modules 530 and to external connections on the links to/from the network element 500. In an exemplary embodiment, the line modules 520 can form ingress and egress switches with the switch modules 530 as center stage switches for a three-stage switch, e.g. a three stage Clos switch. Other configurations and/or architectures are also contemplated. The line modules 520 can include optical transceivers, such as, for example, 1 Gb/s (GbE PHY), 2.5 Gb/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), ODUflex, etc.

Further, the line modules 520 can include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s, N×1.25 Gb/s, and any rate in between. The line modules 520 can include wavelength division multiplexing interfaces, short reach interfaces, and the like, and can connect to other line modules 520 on remote network elements, end clients, edge routers, and the like, e.g. forming connections on the links. From a logical perspective, the line modules 520 provide ingress and egress ports to the network element 500, and each line module 520 can include one or more physical ports. The switch modules 530 are configured to switch channels, timeslots, tributary units, packets, etc. between the line modules 520. For example, the switch modules 530 can provide wavelength granularity (Layer 0 switching), SONET/SDH granularity such as Synchronous Transport Signal-1 (STS-1) and variants/concatenations thereof (STS-n/STS-nc), Synchronous Transport Module level 1 (STM-1) and variants/concatenations thereof, Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; Digital Signal n (DSn) granularity such as DS0, DS1, DS3, etc.; and the like. Specifically, the switch modules 530 can include Time Division Multiplexed (TDM) (i.e., circuit switching) and/or packet switching engines. The switch modules 530 can include redundancy as well, such as 1:1, 1:N, etc.

Those of ordinary skill in the art will recognize the network element 500 can include other components which are omitted for illustration purposes, and that the systems and methods described herein are contemplated for use with a plurality of different network elements with the network element 500 presented as an exemplary type of network element. For example, in another exemplary embodiment, the network element 500 may not include the switch modules 530, but rather have the corresponding functionality in the line modules 520 (or some equivalent) in a distributed fashion. For the network element 500, other architectures providing ingress, egress, and switching are also contemplated for the systems and methods described herein. In general, the systems and methods described herein contemplate use with any network element providing switching of channels, timeslots, tributary units, wavelengths, etc. and using the control plane. Furthermore, the network element 500 is merely presented as one exemplary network element 500 for the systems and methods described herein.

Exemplary Controller

Figure 12:
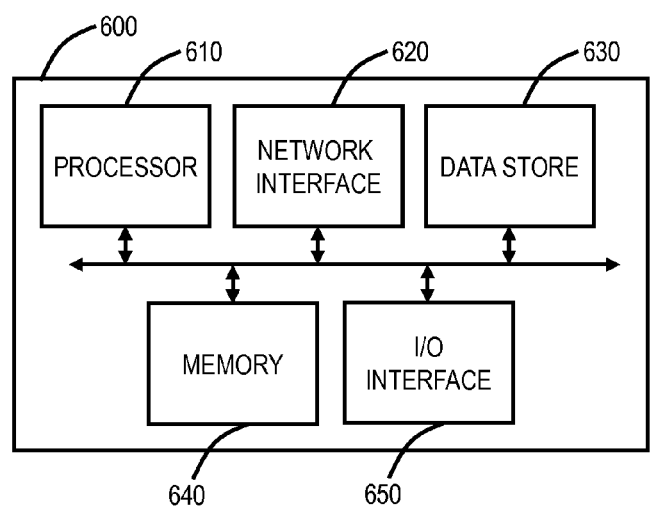
FIG. 12 is a block diagram of an exemplary implementation of a controller.

Referring to FIG. 12, in an exemplary embodiment, a block diagram illustrates an exemplary implementation of a controller 600. When part of the network element 500, the controller 600 provides control plane processing and/or operations, administration, maintenance, and provisioning (OAM&P) for the network element 500. The controller 600 can be part of common equipment, such as common equipment 510 in the network element 500, a stand-alone device communicatively coupled to the network element 500 via the DCN 560, or as the controller 50. The controller 600 can include a processor 610 which is hardware device for executing software instructions such as operating the control plane. The processor 610 can be any custom made or commercially available processor, a central processing unit (CPU), an auxiliary processor among several processors associated with the controller 600, a semiconductor-based microprocessor (in the form of a microchip or chip set), or generally any device for executing software instructions. When the controller 600 is in operation, the processor 610 is configured to execute software stored within memory, to communicate data to and from the memory, and to generally control operations of the controller 600 pursuant to the software instructions. The controller 600 can also include a network interface 620, a data store 630, memory 640, an I/O interface 650, and the like, all of which are communicatively coupled together and with the processor 610.

The network interface 620 can be used to enable the controller 600 to communicate on the DCN 560, such as to communicate control plane information to other controllers, to the management system 550, and the like. The network interface 620 can include, for example, an Ethernet card (e.g., 10BaseT, Fast Ethernet, Gigabit Ethernet) or a wireless local area network (WLAN) card (e.g., 802.11). The network interface 620 can include address, control, and/or data connections to enable appropriate communications on the network. The data store 630 can be used to store data, such as control plane information, provisioning data, OAM&P data, etc. The data store 630 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 630 can incorporate electronic, magnetic, optical, and/or other types of storage media. The memory 640 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 640 may incorporate electronic, magnetic, optical, and/or other types of storage media. Note that the memory 640 can have a distributed architecture, where various components are situated remotely from one another, but may be accessed by the processor 610. The I/O interface 650 includes components for the controller 600 to communicate to other devices.

The controller 600 is configured to operate the control plane in the network 10. That is, the controller 600 is configured to implement software, processes, algorithms, etc. that control configurable features of the network 10, such as automating discovery of the non-adjacent switches, capacity on the links, port availability on the non-adjacent switches, connectivity between ports; dissemination of topology and bandwidth information between the non-adjacent switches; path computation and creation for connections; network level protection and restoration; and the like. As part of these functions, the controller 600 can include a topology database that maintains the current topology of the network 10 based on control plane signaling (e.g., HELLO messages) and a connection database that maintains available bandwidth on the links again based on the control plane signaling. Again, the control plane is a distributed control plane; thus a plurality of the controllers 600 can act together to operate the control plane using the control plane signaling to maintain database synchronization. In source-based routing, the controller 600 at a source node for a connection is responsible for path computation and establishing by signaling other controllers 600 in the network 10. For example, the source node and its controller 600 can signal a path through various techniques such as Resource Reservation Protocol-Traffic Engineering (RSVP-TE) (G.7713.2), Private Network-to-Network Interface (PNNI), Constraint-based Routing Label Distribution Protocol (CR-LDP), etc. and the path can be signaled as a Designated Transit List (DTL) in PNNI or an Explicit Route Object (ERO) in RSVP-TE/CR-LDP. As described herein, the connection refers to a signaled, end-to-end connection such as an SNC, SNCP, LSP, etc. Path computation generally includes determining a path, i.e. traversing the links through the non-adjacent switches from the originating node to the destination node based on a plurality of constraints such as administrative weights on the links, bandwidth availability on the links, etc. In addition to the above, the controller 50 can utilize an implementation similar to the controller 600.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A hybrid control method for a network, comprising:
 operating edge switches under software defined networking control, wherein each of the edge switches is communicatively coupled to a controller to perform the software defined networking control;
 operating non-adjacent switches communicatively coupling the edge switches together, wherein the non-adjacent switches are under distributed control via a control plane, and wherein the non-adjacent switches are not under the software defined networking control; and
 utilizing the controller to route traffic between the edge switches through the non-adjacent switches in a hybrid control scheme comprising both the software defined networking control and the distributed control, wherein the controller is configured to control the edge switches and the control plane is configured to control the non-adjacent switches, and wherein the hybrid-control scheme comprises programming connections at the edge switches via the controller and triggering instructions from a port of the edge switches to the control plane via a non-adjacent switch connected to the port such that the control plane establishes connectivity for the connections between the edge switches.

2. The hybrid control method of claim 1, further comprising:
 providing the controller a topology by the edge switches.

3. The hybrid control method of claim 2, further comprising:
 providing the controller an identity and remote endpoint for each physical port, and a set of logical ports associated with the physical port for each of the physical ports.

4. The hybrid control method of claim 1, wherein the edge switches comprise logical ports and physical ports, wherein the logical ports are connected through the non-adjacent switches via the distributed control, and wherein the connections of logical ports to remote edge switches are managed by the software defined networking control.

5. The hybrid control method of claim 1, further comprising:
 causing the non-adjacent switches by the controller to form connections between the edge switches, wherein the non-adjacent switches utilize a control plane to establish the connections.

6. The hybrid control method of claim 5, wherein the connections comprise any of virtual local area networks, subnetwork connections, label switched paths, and link aggregation groups, and wherein the connections are established without software defined networking control.

7. The hybrid control method of claim 5, wherein the connections are initiated by the controller via one of an explicit route object or a designated transit list.

8. The hybrid control method of claim 5, further comprising:
creating match/action rules for forwarding tables at the edge switches to switch packet flows across the connections.

9. The hybrid control method of claim 5, wherein the connections are initiated by the controller with metadata included in signaling.

10. The hybrid control method of claim 1, wherein the software defined networking control is implemented only at the edge switches which are communicatively coupled to client devices.

11. A network, comprising:
a plurality of edge switches under software defined networking control;
a controller, wherein each of the plurality of edge switches is communicatively coupled to the controller to perform the software defined networking control;
a plurality of non-adjacent switches communicatively coupling the edge switches together, wherein the non-adjacent switches are under distributed control via a control plane, and wherein the non-adjacent switches are not under the software defined networking control; and
wherein the controller is configured to route traffic between the edge switches through the non-adjacent switches in a hybrid control scheme comprising both the software defined networking control and the distributed control, wherein the controller is configured to control the edge switches and the control plane is configured to control the non-adjacent switches, and wherein the hybrid-control scheme comprises programming connections at the edge switches via the controller and triggering instructions from a port of the edge switches to the control plane via a non-adjacent switch connected to the port such that the control plane establishes connectivity for the connections between the edge switches.

12. The network of claim 11, wherein the plurality of edge switches are configured to provide a topology to the controller comprising an identity and remote endpoint for each physical port and a set of logical ports associated with the physical port for each of the physical ports.

13. The network of claim 11, wherein the plurality of edge switches comprise logical ports and physical ports, wherein the logical ports are connected through the non-adjacent switches via the distributed control, and wherein the connection of logical ports to remote edge switches are managed by the software defined networking control.

14. The network of claim 11, wherein the controller is configured to cause the non-adjacent switches by the controller to form connections between the edge switches, wherein the non-adjacent switches utilize a control plane to establish the connections.

15. The network of claim 14, wherein the connections comprise any of virtual local area networks, subnetwork connections, label switched paths, and link aggregation groups, and wherein the connections are established without software defined networking control.

16. The network of claim 14, wherein the connections are initiated by the controller via one of an explicit route object or a designated transit list.

17. The network of claim 14, wherein the controller is configured to create match/action rules for forwarding tables at the plurality of edge switches to switch connections across the connections.

18. The network of claim 14, wherein the connections are initiated by the controller with metadata included in signaling.

19. The network of claim 11, wherein the software defined networking control is implemented only at the plurality of edge switches which are communicatively coupled to client devices.

20. A controller, comprising:
a network interface communicatively coupled to a plurality of edge switches;
a processor; and
memory storing instructions that, when executed, cause the processor to:
receive topology of the plurality of edge switches;
cause connections to be created via distributed control, via a control plane separate from the controller, between non-adjacent switches connected to the plurality of edge switches; and
program forwarding tables at the plurality of edge switches through the connections;
wherein the non-adjacent switches are not under software defined control associated with the controller, and
wherein the controller is configured to control the edge switches and the control plane is configured to control the non-adjacent switches, and wherein a hybrid-control scheme comprises programming connections at the edge switches via the controller and triggering instructions from a port of the edge switches to the control plane via a non- adjacent switch connected to the port such that the control plane establishes connectivity for the connections between the edge switches.

* * * * *